United States Patent
Troia et al.

(10) Patent No.: US 12,259,781 B2
(45) Date of Patent: Mar. 25, 2025

(54) DETERMINING VALIDITY OF DATA READ FROM MEMORY BY A CONTROLLER

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 248 days.

(21) Appl. No.: 17/226,787

(22) Filed: Apr. 9, 2021

(65) Prior Publication Data
US 2021/0224159 A1 Jul. 22, 2021

Related U.S. Application Data

(63) Continuation of application No. 15/991,463, filed on May 29, 2018, now Pat. No. 11,003,537.

(51) Int. Cl.
| | | |
|---|---|---|
| G06F 11/00 | (2006.01) |
| G06F 11/07 | (2006.01) |
| G06F 11/10 | (2006.01) |
| G06F 11/14 | (2006.01) |
| G06N 3/04 | (2023.01) |
| H04L 9/32 | (2006.01) |

(52) U.S. Cl.
CPC ............ G06F 11/10 (2013.01); G06F 11/073 (2013.01); G06F 11/1417 (2013.01); G06N 3/04 (2013.01); H04L 9/3239 (2013.01)

(58) Field of Classification Search
CPC .... G06F 11/1417; G06F 11/073; G06F 11/10; G06F 11/1004; G06F 21/64; G06N 3/04; H04L 9/3239
See application file for complete search history.

(56) References Cited

U.S. PATENT DOCUMENTS

| | | | |
|---|---|---|---|
| 7,457,951 B1 * | 11/2008 | Proudler | G06F 21/567 |
| | | | 726/26 |
| 8,452,465 B1 | 5/2013 | Sinha et al. | |
| 8,560,823 B1 | 10/2013 | Aytek et al. | |
| 9,063,818 B1 | 6/2015 | Risbood et al. | |
| 10,409,585 B2 | 9/2019 | Troia et al. | |
| 10,572,242 B1 | 2/2020 | Santharam et al. | |
| 11,003,537 B2 * | 5/2021 | Troia | G06F 11/1417 |
| 11,144,301 B2 | 10/2021 | Troia et al. | |
| 11,148,301 B2 | 10/2021 | Perlman et al. | |
| 2004/0098715 A1 | 5/2004 | Aghera et al. | |

(Continued)

OTHER PUBLICATIONS

Title: Over-The-Air (OTA) Update for Firmware of a Vehicle Component, U.S. Appl. No. 15/896,899, filed Feb. 14, 2018, Inventors: Alberto Troia et al., Status: Patented Case, Status Date: Nov. 2, 2018.

(Continued)

*Primary Examiner* — Joseph D Manoskey
(74) *Attorney, Agent, or Firm* — Greenberg Traurig

(57) ABSTRACT

A method includes: generating, based on a hash function using at least one input including first data, a first digest; storing the first data in a memory; reading the first data from the memory; generating, based on the read data, a second digest; comparing the first digest and the second digest; and determining, based on comparing the first digest and the second digest, whether the read data is corrupted.

20 Claims, 10 Drawing Sheets

(56) References Cited

U.S. PATENT DOCUMENTS

| | | |
|---|---|---|
| 2004/0210752 A1 | 10/2004 | Rao |
| 2006/0075401 A1 | 4/2006 | Smegner |
| 2008/0140909 A1 | 6/2008 | Flynn et al. |
| 2008/0291014 A1 | 11/2008 | Chigusa et al. |
| 2008/0307270 A1 | 12/2008 | Li |
| 2009/0113210 A1 | 4/2009 | Westerinen et al. |
| 2010/0174921 A1 | 7/2010 | Abzarian et al. |
| 2011/0010543 A1 | 1/2011 | Schmidt et al. |
| 2011/0131447 A1 | 6/2011 | Prakash et al. |
| 2012/0203980 A1 | 8/2012 | Flynn et al. |
| 2013/0012168 A1 | 1/2013 | Rajadurai et al. |
| 2013/0332426 A1* | 12/2013 | Nishida .................. G06F 21/57 707/690 |
| 2014/0226413 A1 | 8/2014 | Gomez et al. |
| 2014/0317479 A1 | 10/2014 | Candelaria |
| 2014/0325500 A1 | 10/2014 | Jang et al. |
| 2014/0351544 A1 | 11/2014 | Abzarian et al. |
| 2015/0012738 A1 | 1/2015 | Shah et al. |
| 2015/0113520 A1 | 4/2015 | Kotani et al. |
| 2016/0366112 A1 | 12/2016 | Gropper |
| 2017/0063540 A1 | 3/2017 | Blommaert et al. |
| 2017/0070890 A1* | 3/2017 | Luff .................... H04W 12/106 |
| 2017/0093582 A1* | 3/2017 | Keidar .................. G06F 9/4416 |
| 2017/0192844 A1* | 7/2017 | Lea ..................... G06F 11/1048 |
| 2017/0235956 A1 | 8/2017 | Maletsky |
| 2018/0019876 A1* | 1/2018 | Moss .................... H04L 9/0643 |
| 2018/0024826 A1 | 1/2018 | Caushi et al. |
| 2018/0235956 A1 | 8/2018 | Laberge et al. |
| 2018/0275982 A1 | 9/2018 | Hunt et al. |
| 2019/0005245 A1 | 1/2019 | Laffey |
| 2019/0036948 A1 | 1/2019 | Appel et al. |
| 2019/0054873 A1 | 2/2019 | Liongosari et al. |
| 2019/0205765 A1 | 7/2019 | Mondello et al. |
| 2019/0250900 A1 | 8/2019 | Troia et al. |
| 2019/0370114 A1 | 12/2019 | Troia et al. |
| 2019/0391802 A1 | 12/2019 | Troia et al. |
| 2020/0353878 A1 | 11/2020 | Briggs |
| 2021/0011632 A1* | 1/2021 | Stöttinger ........... G06F 16/9014 |
| 2022/0019423 A1 | 1/2022 | Troia et al. |
| 2023/0152980 A1* | 5/2023 | Cherches .............. G06F 3/0619 711/154 |

OTHER PUBLICATIONS

Title: Over-The-Air (OTA) Update for Firmware of a Vehicle Component, U.S. Appl. No. 16/563,016, filed Sep. 6, 2019, Inventors: Alberto Troia et al., Status: Patented Case, Status Date: Dec. 7, 2020.

Title: Over-The-Air (OTA) Update for Firmware of a Vehicle Component, U.S. Appl. No. 17/489,448, filed Sep. 29, 2021, Inventors: Alberto Troia et al., Status: Docketed New Case—Ready for Examination, Status Date: Oct. 16, 2021.

Title: Determining Validity of Data Read from Memory by a Controller, U.S. Appl. No. 15/991,463, filed May 29, 2018, Inventors: Alberto Troia et al., Status: Patented Case, Status Date: Jul. 10, 2020.

International Search Report and Written Opinion, PCT/US2019/030065, mailed Aug. 14, 2019.

\* cited by examiner

DETERMINING VALIDITY OF DATA READ FROM MEMORY BY A CONTROLLER

RELATED APPLICATIONS

The present application is a continuation application of U.S. patent application Ser. No. 15/991,463, filed May 29, 2018, and entitled "Determining Validity of Data Read from Memory by a Controller," the entire disclosure of which application is hereby incorporated herein by reference.

FIELD OF THE TECHNOLOGY

At least some embodiments disclosed herein relate to memory operations in a computing system in general and more particularly, but not limited to determining the validity of data read from memory (e.g., a volatile or non-volatile memory device) by a computing device (e.g., a controller).

BACKGROUND

Memory devices are frequently provided as internal, semiconductor, integrated circuits and/or external removable devices in computers or other electronic devices. There are many different types of memory, including volatile and non-volatile memory. Volatile memory, including random-access memory (RAM), static random access memory (SRAM), dynamic random access memory (DRAM), and synchronous dynamic random access memory (SDRAM), among others, may require a source of applied power to maintain its data. Non-volatile memory, by contrast, can retain its stored data even when not externally powered. Non-volatile memory is available in a wide variety of technologies, including flash memory (e.g., NAND and NOR) phase change memory (PCM), resistive random access memory (RRAM), and magnetic random access memory (MRAM), among others.

Memory devices can include large arrays of memory cells for storing data, frequently organized into rows and columns. Individual memory cells and/or ranges of memory cells can be addressed by their row and column. When a memory array is addressed, there may be one or more layers of address translation to, for example, translate between a logical address utilized by a host device and a physical address corresponding to a location in the memory array. Although uncommon, it is possible for the address information provided to a memory device on a command/address bus thereof to be corrupted by an error, such that an internal operation of the memory device (e.g., a read operation, a write operation, an erase operation, etc.) can be performed on a different physical address than was requested by a host device.

In some cases, memory devices are used to store data for operating autonomous vehicles. For example, a control system of a vehicle can use stored data to autonomously navigate and drive the vehicle. In one example, a memory device stores data for an artificial neural network (ANN) that analyzes sensor inputs provided by sensors of the vehicle.

Recent developments in the technological area of autonomous driving allow a computing system to operate, at least under some conditions, control elements of a vehicle without the assistance from a human operator of the vehicle. For example, sensors (e.g., cameras and radars) can be installed on a vehicle to detect the conditions of the surroundings of the vehicle on a roadway. A computing system installed on the vehicle analyzes the sensor inputs to identify the conditions and generate control signals or commands for the autonomous adjustments of the direction and/or speed of the vehicle, without any input from a human operator of the vehicle. Autonomous driving and/or advanced driver assistance system (ADAS) typically involves use of an ANN for the identification of events and/or objects that are captured in sensor inputs.

In general, an artificial neural network (ANN) uses a network of neurons to process inputs to the network and to generate outputs from the network. Each neuron m in the network receives a set of inputs $p_k$, where $k=1, 2, \ldots, n$. In general, some of the inputs to a neuron may be the outputs of certain neurons in the network; and some of the inputs to a neuron may be the inputs to the network as a whole. The input/output relations among the neurons in the network represent the neuron connectivity in the network.

Each neuron m has a bias $b_m$, an activation function $f_m$, and a set of synaptic weights $w_{mk}$ for its inputs $p_k$ respectively, where $k=1, 2, \ldots, n$. The activation function may be in the form of a step function, a linear function, a log-sigmoid function, etc. Different neurons in the network may have different activation functions.

Each neuron m generates a weighted sum $s_m$ of its inputs and its bias, where $s_m = b_m + w_{m1} \times p_1 + w_{m2} \times p_2 + \ldots + w_{mn} \times p_n$. The output $a_m$ of the neuron m is the activation function of the weighted sum, where $a_m = f_m(s_m)$.

The relations between the input(s) and the output(s) of an ANN in general are defined by an ANN model that includes the data representing the connectivity of the neurons in the network, as well as the bias $b_m$, activation function $f_m$, and synaptic weights $w_{mk}$ of each neuron m. Using a given ANN model a computing device computes the output(s) of the network from a given set of inputs to the network.

For example, the inputs to an ANN network may be generated based on camera inputs; and the outputs from the ANN network may be the identification of an item, such as an event or an object.

For example, U.S. Pat. App. Pub. No. 2017/0293808, entitled "Vision-Based Rain Detection using Deep Learning", discloses a method of using a camera installed on a vehicle to determine, via an ANN model, whether the vehicle in in rain or no rain weather.

For example, U.S. Pat. App. Pub. No. 2017/0242436, entitled "Road Construction Detection Systems and Methods", discloses a method of detecting road construction using an ANN model.

For example, U.S. Pat. Nos. 9,672,734 and 9,245,188 discuss techniques for lane detection for human drivers and/or autonomous vehicle driving systems.

In general, an ANN may be trained using a supervised method where the synaptic weights are adjusted to minimize or reduce the error between known outputs resulted from respective inputs and computed outputs generated from applying the inputs to the ANN. Examples of supervised learning/training methods include reinforcement learning, and learning with error correction.

Alternatively or in combination, an ANN may be trained using an unsupervised method where the exact outputs resulted from a given set of inputs is not known a priori before the completion of the training. The ANN can be trained to classify an item into a plurality of categories, or data points into clusters. Multiple training algorithms are typically employed for a sophisticated machine learning/training paradigm.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
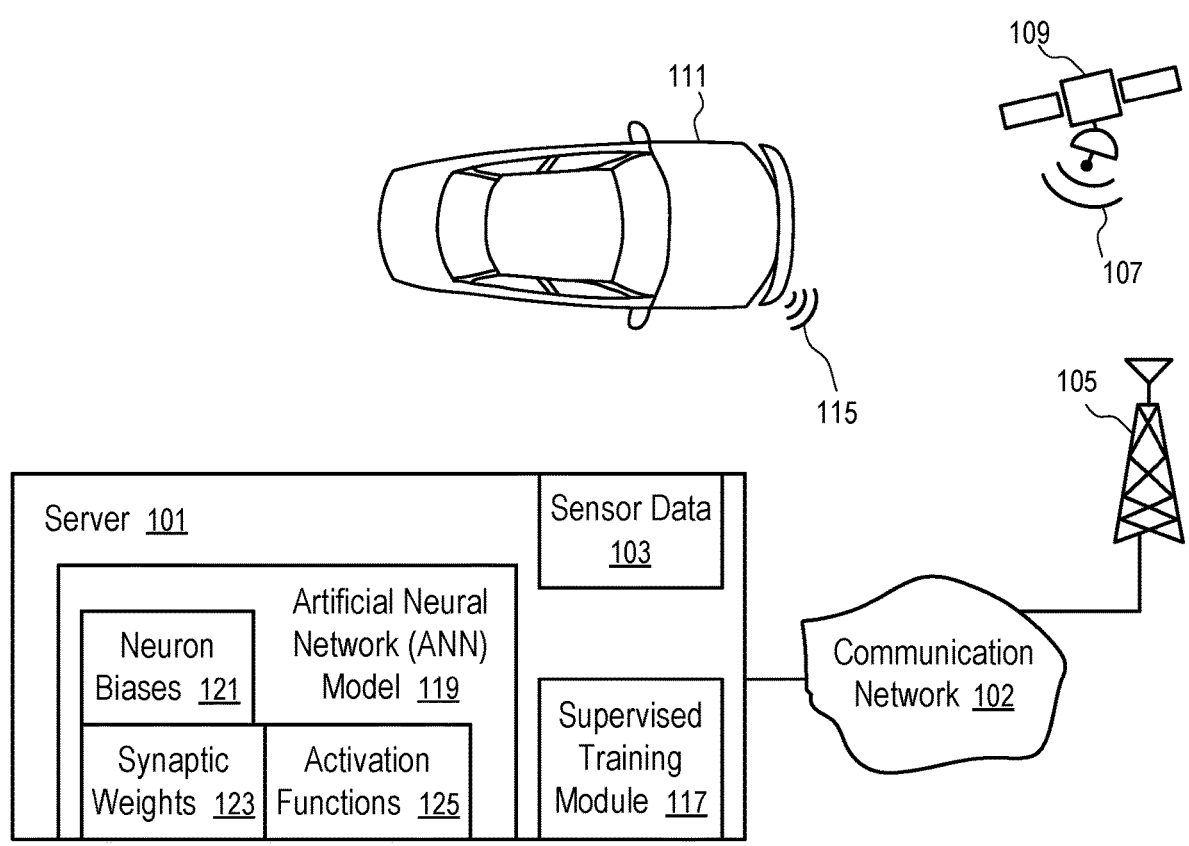
FIG. 1 shows a system using an Artificial Neural Network (ANN) model, according to one embodiment.

Implementing fault tolerance into a computing system often presents one or more technical problems. For example, if fault tolerance is implemented in an ad-hoc manner, various fault tolerant mechanisms can themselves become a primary source of faults and unreliability in the resulting architecture.

In one example, essential services are provided by a fault tolerant architecture including a main controller used in an automotive application compliant with ISO26262 (Road Vehicles—Functional Safety). A feedback mechanism is used such that data transmitted on a bus from a memory device to the main controller is not affected by errors induced by noise, cross talk and other source of soft errors.

The memory device can be, for example, either volatile or non-volatile, and provides data to the controller in order to execute and/or store information. A portion of the memory can store critical code, for example firmware, software, and/or results and data for temporary calculations used by a process or application executing on the controller.

In the automotive industry, the ISO26262 (Road Vehicles—Functional Safety) standard provides guidelines to reduce the probability that a system executes incorrect codes. The implementation of this standard in autonomous driving applications is done using redundancy and the error correction mechanism in order to detect and correct errors generated inside an array.

However, in some cases, this error correction not only implements a feature to correct the errors, but also can cause technical problems. For example, if a page contains a number of errors that exceeds (overloads) the correction power of the correction algorithm itself, then the algorithm introduces additional errors in different locations.

Due to the above problems, it is desirable in some cases for a system to be informed about the correction of the internal error, and/or to disable an internal mechanism and let an external application controller take over management of the correction. In addition, in real-time operating systems, it is desirable in some cases to ensure the correctness of the data transmission between the memory device and the system controller, and the subsequent execution by the system controller of the proper code.

In some cases, errors can occur that affect address information provided by a controller to a memory device on a command/address bus (e.g., during address translation, during command/address bus operations, etc.). Such errors can cause a memory operation to be performed at a different physical address than is desired. In other cases, stored data can become invalid due to undesired changes in the storage state of the data.

There are, for example, several potential causes of data errors in memory. Typical memory systems contain a spare area used to store ECC data. For example, for NAND flash, the ECC calculation is done externally such that there is an external controller that calculates and stores ECC data. In another example, in the case of DRAM, ECC corrections are internally calculated and are not available to an external controller. Some DRAM implementations can communicate externally when ECC corrections are made. However, in some cases, the number of data errors that occur in a memory system can exceed the capability of the system's ECC correction capability. This can introduce errors into data that is read from the memory.

In another example of a data error, bits can flip from one to zero, or zero to one, due to x-rays or alpha particles from space impacting the capacitor charge in a cell that stores data. Also, aging can cause bits to flip slowly over time, or even sometimes to flip suddenly.

Errors can also be caused by incorrect page decoding. A defective charge pump or a logic gate transitioning from the device interface to the memory array can cause a bit to be stuck at the value of another bit. This situation can cause data to be read from the wrong page. In some cases, this would not flag any errors in the computing system because the controller issued the correct address, and the ECC read from the page would be correct for the page that was read. However, the read data would be from the wrong page.

Accordingly, various embodiments herein verify that the proper data is read from a memory (e.g., to determine whether the data is corrupted). For example, this is done to verify that the data read from a non-volatile memory corresponds to the address from which data has been requested by a controller or other computing device.

In some cases, a computing system contains a controller (e.g., a microprocessor) and a memory sub-system (e.g., volatile memory used as system memory by the controller). Data written from the controller to the memory and subsequently read back to the controller can get corrupted in many ways. Some existing mechanisms, such as error correction codes (ECC), can detect and fix some of these errors. However, ECC processing can become overloaded, and errors will remain in the data read from the memory. Various embodiments described below can detect data corruption or addressing errors that occur anywhere along the data storage or transmission path to or from the controller and memory.

At least some embodiments disclosed herein provide a method that uses a cryptographic hash function to detect data or address corruption in a computing system (e.g., an error that occurs in a read address during a memory storage operation, or read data that has been corrupted while stored in the memory). In one example, the computing system includes an application controller that implements an artificial neural network (ANN). For example, memory (e.g., DRAM) can store pages in the memory that correspond to matrices for the ANN. If data stored for the ANN becomes corrupted, or there is a read address error during operation that incorrectly returns data stored at an address other than was intended, improper control or operation of a vehicle controlled by the ANN can result in physical damage and/or severe personal injury.

In various embodiments, when data is written from the controller to memory (e.g., a boot device or a system memory), a cryptographic hash function is run to generate a hash digest. The hash digest is stored in memory along with the data written by the controller. In some cases, the input to the hash function can include extra data associated with the data to be written such as metadata and/or the address to which the data is written in the memory.

Later, when the data is read back from memory into the controller, the controller (or another computing device such as a security device running a safety hypervisor that monitors activities to provide secure operation of the computing system) re-calculates the hash digest on the read data and compares it with the hash digest previously stored when the data was written to memory. If the two hash digests are not the same, it is determined that the data has been corrupted. In response to determining that the read data is corrupted, one or more actions can be performed. For example, the controller can take measures to fix the problem or contain the corrupted data.

Various embodiments as described herein can provide a solution to one or more of the above data error problems by using cryptography to enable a system to detect any corruption with either addresses or data going to or from the memory. This includes any bus errors at any point in the path between the host controller and memory. If an address is wrong or a data bit has changed in memory or anywhere along the transmission path, a hash digest that is calculated by the host controller will be different from the hash digest stored in memory, and the data error will be detected.

In some cases, various embodiments use a cryptographic engine to generate the hash digest when data is read in order to determine if the address and read data are linked in unusual ways, such as aging of the decoding circuits or high voltage circuits that causes address or data bits to get linked together or stuck at a wrong value.

The embodiments described herein also can be used with many various types of memory. For example, the embodiments can be used with two types of memory in predominant use in computing systems today: DRAM and NAND flash. The present embodiments can also be applied to many other types of memory as well such as 3D XPoint, resistive RAM, Spin Torque, etc. In some non-limiting examples discussed below, the memory stores data for an artificial neural network (ANN).

FIG. 1 shows a system using an Artificial Neural Network (ANN) model 119, according to one embodiment. The system of FIG. 1 includes a centralized server (101) in communication with a vehicle 111 via a communications network (102).

The server (101) includes a supervised training module (117) to train, generate, and update an artificial neural network (ANN) model (119) that includes neuron biases (121), synaptic weights (123), and activation functions (125) of neurons in a network used for processing sensor data generated in the vehicle 111.

Once the ANN model (119) is designed, trained and implemented, e.g., for autonomous driving and/or advanced driver assistance system, the ANN model (119) can be deployed on vehicle 111 for real-world usage.

Typically, the vehicle 111 has sensors, such as a visible light camera, an infrared camera, a LIDAR, a RADAR, a sonar, and/or a set of peripheral sensors. The sensors of the vehicle 111 generate sensor inputs for the ANN model (119) in autonomous driving and/or advanced driver assistance system to generate operating instructions, such as steering, braking, accelerating, driving, alerts, emergency response, etc.

During the operations of the vehicle 111, the vehicle 111 encounters items, such as events or objects, that are captured in the sensor data. The ANN model (119) is used by the vehicle 111 to provide the identifications of the items to facilitate the generation of commands for the operations of the vehicle 111, such as for autonomous driving and/or for advanced driver assistance.

Some of the encountered items may be unexpected and thus not fully considered in the design, training and/or implementation of the ANN model (119). As a result, the ANN model (119) may identify the unexpected item as unknown, or fails to classify the item into a single known category.

A function of the vehicle 111 for autonomous driving and/or advanced driver assistance may process such an unknown item according to a pre-programmed policy. For example, as a response to the detection of an unknown event or object, the vehicle (111) may be programmed to avoid the item, initiate a safe-mode response, alert a human operator to take control, request assistance from a human operator, place the vehicle in a safer situation by keeping a distance, and/or slow down for a stop, etc.

When an output, generated by using the ANN model (119) from a particular sensor input, identifies an unknown item (or classifies an item with an insufficient precision or confidence level), the vehicle 111 is configured to store the particular sensor input that is responsible for the output and/or transmit the sensor input to the centralized server (101). The sensor input selected and transmitted back to the server (101) enriches the sensor data (103) for the training and updating of the ANN model (119) through a supervised machine learning technique implemented in the training model (117).

For example, vehicle (111) may communicate, via a wireless connection (115) to an access point (or base station) (105), with the server (101) to submit the sensor input to enrich the sensor data (103) as an additional dataset for machine learning implemented using the supervised training module (117). The wireless connection (115) may be made via a wireless local area network, a cellular communications network, and/or a communication link (107) to a satellite (109) or a communication balloon.

Periodically, the server (101) runs the supervised training module (117) to update the ANN model (119). The server (101) may use the sensor data (103) enhanced with the sensor inputs from the vehicle (111) and/or from similar vehicles that are operated in the same geographical region or in geographical regions having similar traffic conditions to generate a customized version of the ANN model (119) for the vehicle (111).

Since the updated version of the ANN model (119) is trained, via machine learning, using the sensor inputs associated with the previously unexpected or unrecognized items to recognize and/or classify with certainty and accuracy these items and/or similar items. Thus, the capability of the ANN model (119) is enhanced.

The updated ANN model (119) can be downloaded to the vehicles (e.g., 111) via the communications network (102), the access point (or base station) (105), and communication links (115 and/or 117) as an over-the-air update of the firmware/software of the vehicles (e.g., 111).

Optionally, the vehicle (111) has a self-learning capability. After an extended period on the road, the vehicle (111) may generate a new set of synaptic weights (123), neuron biases (121), activation functions (125), and/or neuron connectivity for the ANN model (119) installed in the vehicle (111) using the sensor inputs it collected and stored in the vehicle (111), such as the sensor inputs capturing the unexpected, unknown, and/or unrecognized events or objects.

As an example, the centralized server (101) may be operated by a factory, a producer or maker of the vehicles (111, ..., 113), or a vendor of the autonomous driving and/or advanced driver assistance system for vehicle 111.

Figure 2:
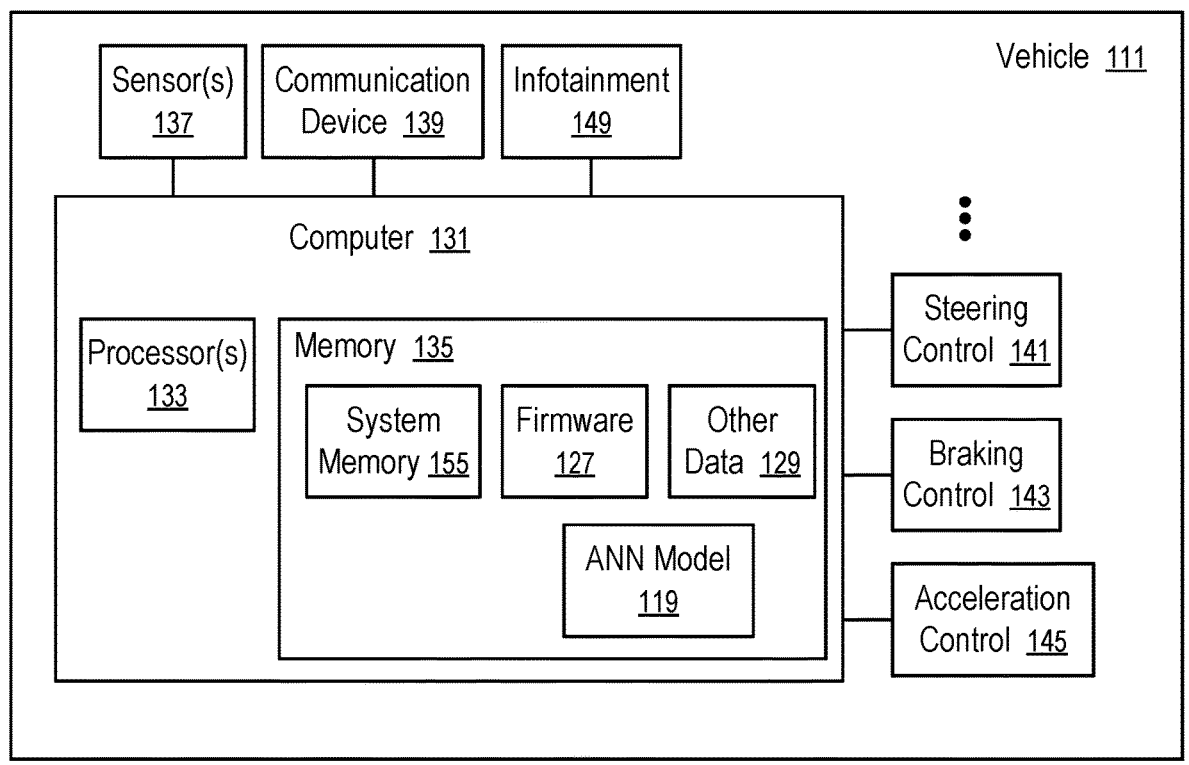
FIG. 2 shows an example of a vehicle configured in the system of FIG. 1 where the vehicle uses an Artificial Neural Network (ANN) model, according to one embodiment.

FIG. 2 shows an example of a vehicle configured in the system of FIG. 1 where the vehicle uses Artificial Neural Network (ANN) model 119, according to one embodiment. The vehicle (111) of FIG. 2 includes an infotainment system (149), a communication device (139), one or more sensors (137), and a computer (131) that is connected to some controls of the vehicle (111), such as a steering control (141) for the direction of the vehicle (111), a braking control (143) for stopping of the vehicle (111), an acceleration control (145) for the speed of the vehicle (111), etc.

The computer (131) of the vehicle (111) includes one or more processors (133), memory (135) storing firmware (or software) (127), the ANN model (119) (e.g., as illustrated in FIG. 1), and other data (129).

Memory 135 also includes system memory 155. For example, system memory 155 can store matrix rows for an ANN (e.g., see FIGS. 6-9 below). Digest comparison as described herein can be used to determine validity of data read from system memory 155.

The one or more sensors (137) may include a visible light camera, an infrared camera, a LIDAR, RADAR, or sonar system, and/or peripheral sensors, which are configured to provide sensor input to the computer (131). A module of the firmware (or software) (127) executed in the processor(s) (133) applies the sensor input to an ANN defined by the model (119) to generate an output that identifies or classifies an event or object captured in the sensor input, such as an image or video clip.

The identification or classification of the event or object generated by the ANN model (119) can be used by an autonomous driving module of the firmware (or software) (127), or an advanced driver assistance system, to generate a response. The response may be a command to activate and/or adjust one of the vehicle controls (141, 143, and 145).

Optionally, the identification or classification of the event or object is presented to an occupant of the vehicle (111) via the infotainment system (149).

When the identification or classification of the current event or object is to be improved (e.g., when the event or object is identified as unknown, or identified as one of multiple possible events or objects, or identified as being an event or object with a confidence level below a threshold), the computer (131) selects the sensor input (e.g., the image or video clip, or data derived for the ANN from the image or video clip) for storage in the memory (135)). Subsequently, or in real time, the computer (131) transmits the selected sensor input to the server (101) illustrated in FIG. 1 using the communication device (139).

The server (101) stores the received sensor input as part of the sensor data (103) for the subsequent further training or updating of the ANN model (119) using the supervised training module (117).

When an updated version of the ANN model (119) is available in the server (101), the vehicle (111) may use the communication device (139) to download the updated ANN model (119) for installation in the memory (135) and/or for the replacement of the previously installed ANN model (119).

In other embodiments, the computer 131 is a controller such as, for example, a microcontroller, special purpose logic circuitry (e.g., a field programmable gate array (FPGA), an application specific integrated circuit (ASIC), etc.), or other suitable processor. The computer 131 can include a processor 133 configured to execute instructions stored in memory. The memory of the computer 131 can include embedded memory configured to perform various processes, logic flows, and routines for controlling operation of the vehicle 111, including managing the system memory and handling communications between a memory device and a host device (not shown).

In some embodiments, the embedded memory can include memory registers storing, e.g., memory pointers, fetched data, etc. The embedded memory can include volatile and/or non-volatile memory (e.g., DRAM, SRAM, NAND, NOR, PCM) for storing the memory registers, and can also include read-only memory (ROM) (e.g., for storing micro-code).

In operation, the computer 131 can directly write or otherwise program (e.g., erase) the various memory regions of the main memory (e.g., system memory 155), such as by writing to groups of memory pages and/or memory blocks. In NAND-based memory, a write operation often includes programming memory cells in selected memory pages with specific data values (e.g., a string of data bits having a value of either logic 0 or logic 1). An erase operation is similar to a write operation, except that the erase operation re-programs an entire memory block or multiple memory blocks to the same data state (e.g., logic 1).

The computer 131 can communicate with a host device (not shown) over a host-device interface. In some embodiments, the host device and the computer 131 can communicate over a serial interface, such as a serial attached SCSI (SAS), a serial AT attachment (SATA) interface, a peripheral component interconnect express (PCIe), or other suitable interface (e.g., a parallel interface). The host device can send various requests (in the form of, e.g., a packet or stream of packets) to the computer 131. A request can include a command to write, erase, return information, and/or to perform a particular operation (e.g., a TRIM operation). A request can also include an interrupt or another command that indicates a change in condition (e.g., a power loss event), which can trigger the implementation of a power loss algorithm.

The host device (not shown) can be any one of a number of electronic devices capable of utilizing memory for the temporary or persistent storage of information, or a component thereof. For example, host device may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). Host device may be a networking device (e.g., a switch, a router, etc.) or a recorder of digital images, audio and/or video, a vehicle, an appliance, a toy, or any one of a number of other products. In one embodiment, host device may be connected directly to a memory device, although in other embodiments, host device may be indirectly connected to memory device (e.g., over a networked connection or through intermediary devices).

Figure 3:
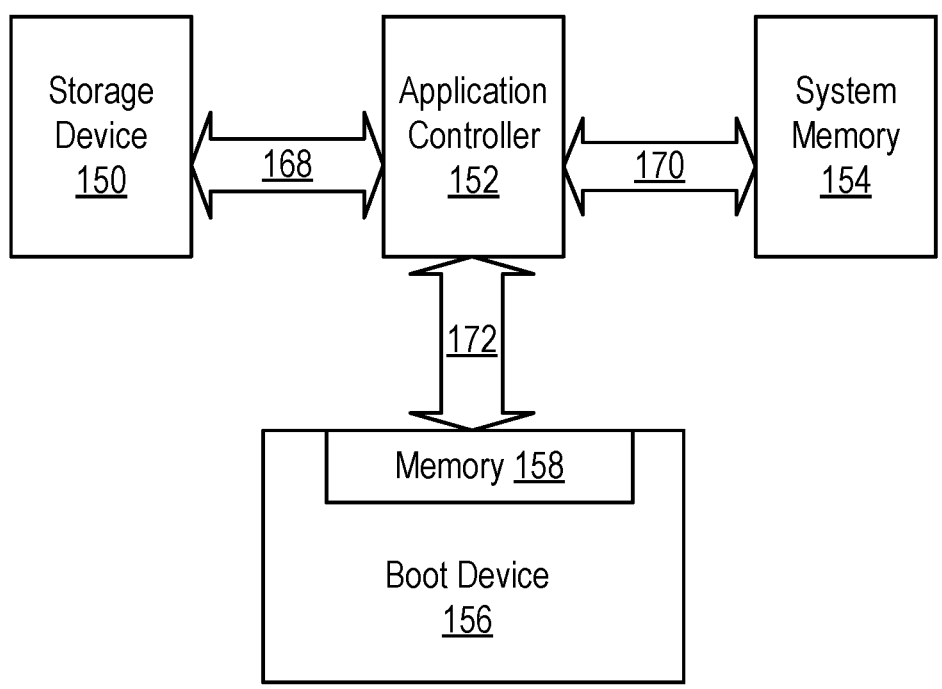
FIG. 3 shows a system for a vehicle including system memory and a boot device, according to one embodiment.

FIG. 3 shows a system for a vehicle including system memory 154, a boot device 156, and a storage device 150 according to one embodiment. The boot device 156 can be configured, for example, by a firmware update. The update can be firmware received, for example, into non-volatile memory of boot device 156.

In one embodiment, the firmware is received by a wireless interface (not shown) of application controller 152. The received update is sent to a memory 158 of boot device 156.

Various types of applications can be controlled and/or supported by application controller 152. Examples of such applications include a cluster, an entertainment or infotainment system, a seat control of vehicle, and a powertrain system of a vehicle.

In one embodiment, a cryptographic engine (not shown) is used to generate various cryptographic values (e.g., hash digests of data). In one embodiment, the cryptographic engine compares hash digests to determine the validity of data (e.g., read by application controller 152 from boot device 156 or system memory 154). In one example, a digest used by the cryptographic engine in the comparison to determine validity of read data is generated using an algorithm such SHA256, SHA2, etc. The cryptographic engine determines, for example, whether to accept or reject the data based on the digest comparison (e.g., digest of data prior to storage in memory as compared to digest of data read from memory). In response to this determination, various actions can be performed, such as for example described below. In one example, the cryptographic engine includes one or more processors and memory located on boot device 156. In another example, the cryptographic engine is on a security device executing a safety hypervisor, or on the application controller 152 itself.

Data may be transferred between components of the system via interconnects 168, 170, 172, each of which may be, for example, an internal or external data or other bus (e.g., Peripheral Component Interconnect (PCI), PCI extended (PCI-X), PCI Express (PCIe)), a communication portion, and/or a computer network.

In one embodiment, one or more of storage device 150, application controller 152, and system memory 154 are portions of a system-on-chip (SOC) device (e.g., all of these components are on the same SOC chip). In one embodiment, boot device 156 may be included as part of the SOC chip. In other embodiments, each of these components may be implemented on separate chips (e.g., mounted on and connected by wiring on a hardware card or other structure).

In one example, application controller 152 is the main MCU running a system (e.g., INTEL corei7 is an application controller of a computer). Various controllers (e.g., memory controller) in the surrounding system serve application controller 152 to execute functions.

In one embodiment, firmware or run-time code is received, via application controller 152, from boot device 156 or system memory 154. The determination is made to reject the data based on the digest comparison above. In response to determining to reject the data, application controller 152, for example, updates at least a portion of data in the boot device 156 and/or the system memory 154.

For example, the data updated may be a software program that includes the rejected data. The determination to reject the data may be communicated from the cryptographic engine to application controller 152. In one embodiment, security of firmware or run-time code is checked using a digest comparison as described herein.

In one example, a page of updated code from an OTA update is received and written into boot device 156 or system memory 154. In one example, a page has a size of at least 4K bytes.

In one example, if an OTA firmware update is rejected, then the entire firmware or run-time code content corresponding to the update is deemed defective or insecure. In such a case, the firmware or run-time code is, for example, updated by a newly-requested secure over-the-air update.

In one embodiment, application controller 152 is used to store data in system memory 154. The application controller 152 generates a first digest using a hash function. The inputs to the hash data include a page of data to be stored in system memory 154, and also an address at which the page will be stored in system memory 154. After generating the first digest, application controller 152 stores the page at the address.

At a later time, application controller 152 reads the stored page from system memory 154 by providing the address above used to store the page. Application controller 152 generates a second digest using the read page and the address as inputs to the hash function. Then, application controller 152 compares the first digest and the second digest, and makes a determination based on this comparison whether the read page is corrupted. For example, the read page can be corrupted due to an error in the data that was stored in system memory 154, and/or due to an error in the addressing as provided to system memory 154.

In one embodiment, the first digest generated prior to storage of data is stored in the system memory 154. For example, a page of data can be stored along with the first digest that was generated. In some cases, the first digest can be stored in a spare area of system memory 154.

In another example, the page of data is stored in a non-volatile memory (e.g., boot device 156). In this example, the first digest can be stored in additional cells that are added to or available in a spare area of the non-volatile memory. For example, the first digest can be stored as being associated with a row of the memory in which the page of data is stored.

In one example, it is desired to program the following pattern: Data=a page of data that the controller needs to store. The pattern Data is to be stored at the address location n. The controller 152 (or a cryptographic engine of another device) calculates the Digest (n)=HASH (Data||Page n Address) that represents the digest associated with the page and its address. As described in the foregoing, the data to be stored is concatenated (indicated by "||") with the address for storage of the page.

The controller stores the Data, the address, the ECC (associated to the page without a signature and the Digest (n) value) and the Digest (n). The digest is generated, for example, as follows: Digest (n)=HASH (Data||metadata (if any)||Page n Address). In one example, the Page n Address is a row address.

In one example, the read mechanism used to read the page of data from the memory is a mechanism that is used to communicate with the controller 152 (e.g., Nand ONFI, SPI, a specific protocol, NOR CFI, DRAM, etc.) The application controller sends the address n of the page, the memory receives the address and then sends out the following data according to the specific interface protocol:

Data+metadata (if any)
ECC (if used)
Digest (n)

When the controller 152 receives the above information, the controller 152 executes the following flow:
Read (and correct) the Data using the ECC (if used); and
Calculate the second digest (e.g., Expected_Digest (n)) as follows:
Digest (n)=HASH (Data||metadata (if any)||Page n Address)

The controller 152 can interpret the presence of a mismatch inside the data read by looking at the comparison of the first digest generated prior to storage of the data to the second digest expected (and calculated) when reading the stored data. If the expected digest does not match the prior stored digest, the data is determined as being invalid.

Figure 4:
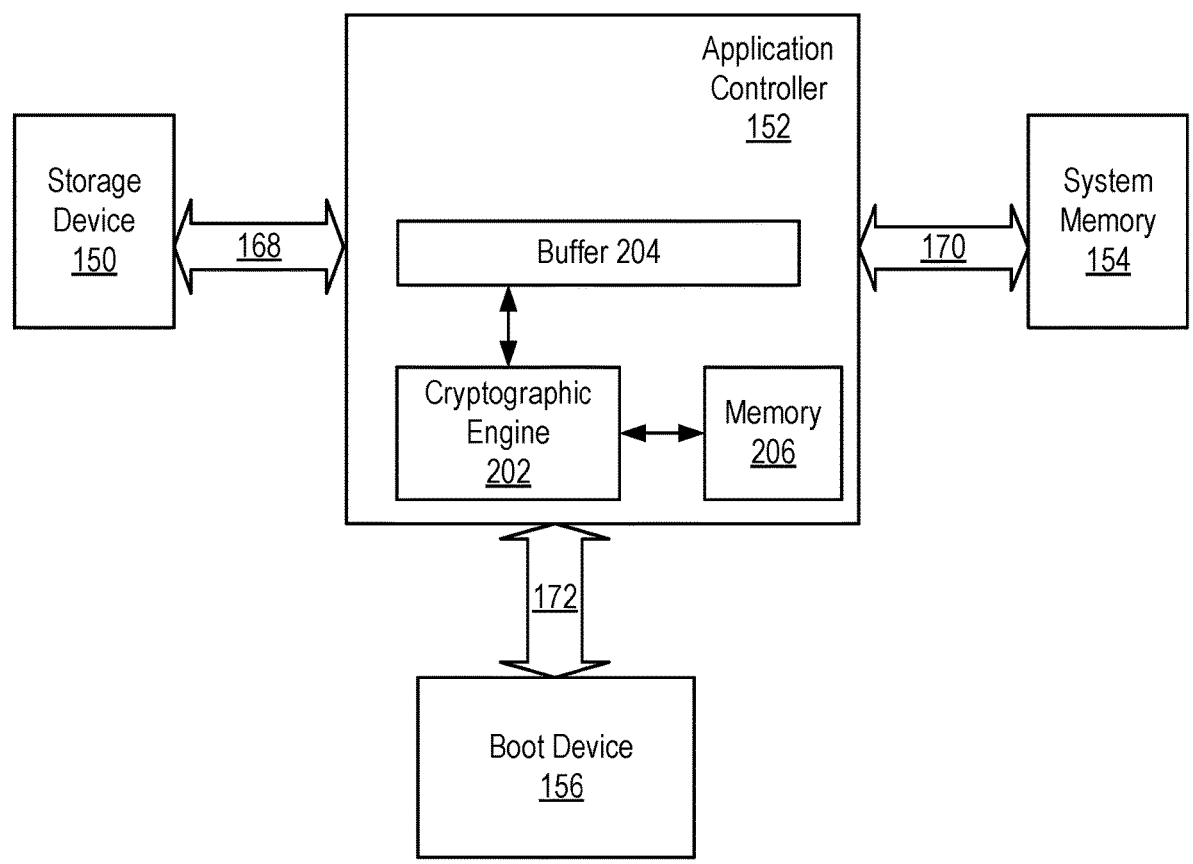
FIG. 4 shows a system for a vehicle, where the system determines whether read data is corrupted using a digest comparison corresponding to the read data, according to one embodiment.

FIG. 4 shows a system for a vehicle (e.g., vehicle 111 of FIGS. 1-2), where the system determines whether read data is corrupted using a digest comparison corresponding to the read data, according to one embodiment. In various embodiments, system memory 154 can store various types of data. In one example, an OTA update is received, via a wireless interface (not shown) of application controller 152 by buffer 204 as a stream of data portions (e.g., a data portion can be a page or a group of pages) that are stored in system memory 154.

In one embodiment, in response to cryptographic engine 202 determining that a page of data is invalid based on digest comparison, application controller 152 discards software previously-stored in system memory 154 from which the invalid page of data was initially obtained. In one example, in response to determining to reject the page of data, cryptographic engine 202 causes application controller 152 to enter or remain in a rescue mode.

In one embodiment, the application controller 152, before reading and/or using data from boot device 156, verifies the identity of the boot device 156 (e.g., to avoid a need for replacement of the boot device component). In this embodiment, the identity verification can be based in part on a block digest (e.g., block digest 511 of FIG. 6 below) stored in the boot device 156.

In one embodiment, the previously-stored software was earlier obtained by an over-the-air update requested by application controller 152. In response to discarding the previously store software, application controller 152 makes a request for a new secure over-the-air update (e.g., from the same or a different source).

In one embodiment, the over-the-air update is received from a computing device such as a server (e.g., server 101 of FIG. 1). When the application controller 152 is in a rescue mode, the application controller 152 may load rescue mode code from boot device 156, and use at least a portion of rescue mode code to obtain from the server a new update of the software that was previously rejected.

In one embodiment, data received by buffer 204 is code obtained from storage device 150. In response to determining that the data is valid, application controller 152 copies the data from buffer 204 to system memory 154.

In another embodiment, the data received by buffer 204 is a portion of run-time code stored in system memory 154. A determination is made whether the code is valid using digest comparison as described herein. In response to determining to accept all portions of data of the run-time code, the run-time code is executed by application controller 152.

In one embodiment, the memory used on boot device 156, storage device 150, and/or system memory 154 can be a non-volatile storage media (e.g., flash memory) and/or volatile memory. This memory may, for example, store the boot code and/or rescue code.

For example, during the boot of an application by application controller 152, the boot code, the operating system (OS), and software code/applications will be moved (in a compressed manner) from the storage device 150 to the system memory 154. Then, this data is uncompressed and execution by application controller 152 begins. When the system is up after the boot, the system memory (e.g., the volatile memory) contains, for example, the entire operating system and all of the software code/applications.

In one embodiment, the boot device 156 has a hardware security module capability and implements the following features: an authenticated command set, protection against replay attacks; a secret key stored inside memory of the boot device 156 (e.g., the secret key is shared with the system developer, which is a source); a cryptographic engine with a built-in, key-based MAC calculator; and a local memory that can be used for program operations.

In one embodiment, application controller 152 accesses the boot device 156 when performing some or all of its operations. This access involves using the secret keys, algorithms, and an authenticated command set. The command set is protected against replay attack. Application controller 152 may certify the validity of data stored in system RAM and/or in storage device 150, and also may certify the validity of secure over-the-air updates such as for firmware updates or boot device updates (security firmware).

In one example, if one or more of any received data portions is found to be not valid, the entire content of the system memory is discarded. Application controller 152 loads rescue mode code from boot device 156 and runs a safety firmware with basic functionalities. In one example, these functionalities include requesting a new certified update from another source.

In another embodiment, at power on of a system, application controller 152 receives secure code stored in storage device 150 that is to be executed. The secure code is certified as being valid prior to executing further operations by application controller 152. Boot code can be used to start an application of application controller 152.

Various embodiments regarding a secure over-the-air (SOTA) update are now described below. In one embodiment, the update is used for updating code in boot device 156 and/or code in storage device 150. For example, the update may be a real software update. In another example, the update may be performed to repair code from a recognized attack determined by digest comparison.

In one embodiment, application controller 152 receives an update from a remote location. This update can be, for example, a storage device content update. A system provider can, for example, use this approach to update an application, such as improving functionalities and/or security. In one embodiment, application controller 152 stores the received update inside system memory 154 and/or stores a signature of the update inside system memory 154.

In one embodiment, if the received data is authenticated, the update is accepted. For example, the update is copied inside the storage device 150 for a system firmware update, or inside boot device 156 for a boot firmware update. A signature of the software update can be, for example, stored inside boot device 156 for certifying subsequent operations (e.g., operations during boot and/or run-time). If the received data fails authentication, then the system can enter or remain in a rescue mode.

In one embodiment, when an update is downloaded by application controller 152, an image is stored first in system memory (e.g., DRAM), and/or from time-to-time stored in storage device 150. The update is signed (by calculating its MAC) and the signature is the mechanism to ensure that the downloaded content inside the memory is authentic. To perform a check of the signature, all of the data is downloaded, the data is measured against the internal application secret key, and then the final signature is compared with the received signature.

Figure 5:
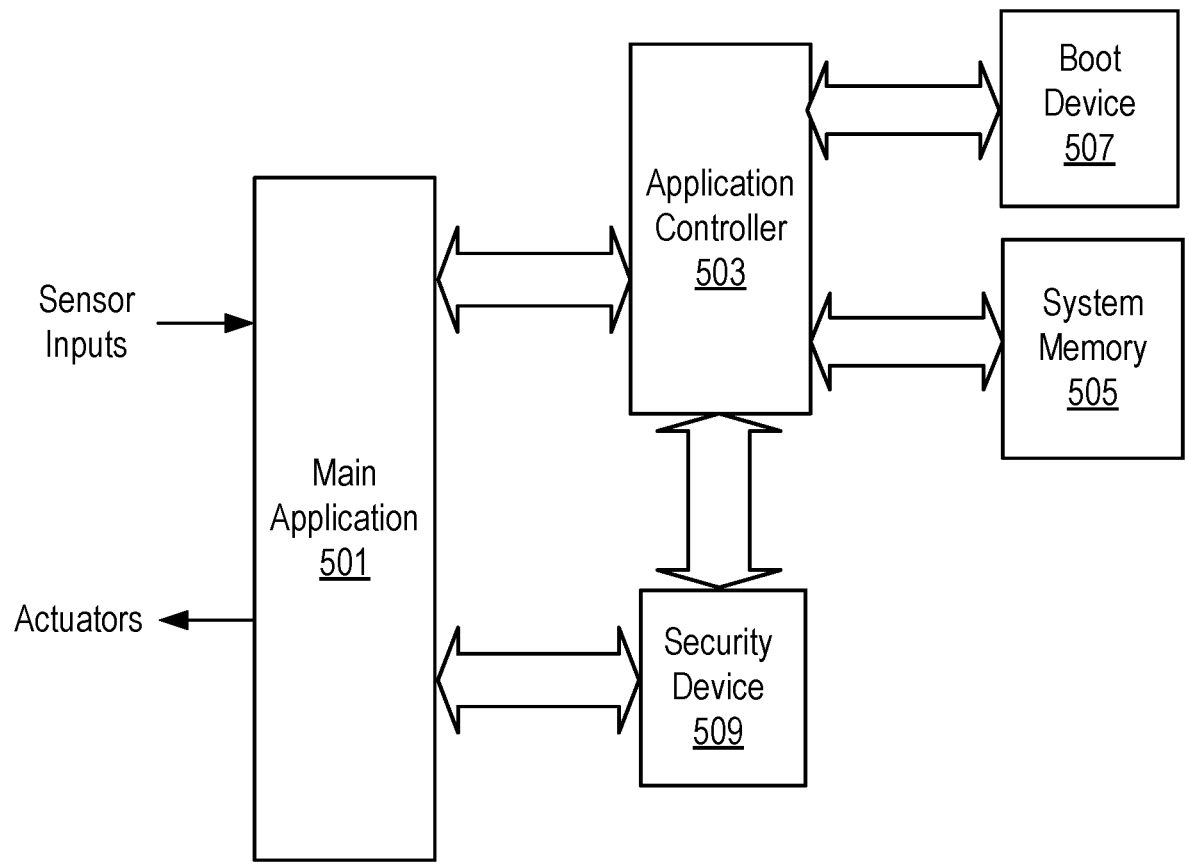
FIG. 5 shows a computing system including an application controller that reads data from a boot device and/or a system memory, according to one embodiment.

FIG. 5 shows a computing system including an application controller 503 that securely reads data from a boot device 507 and/or a system memory 505, according to one embodiment. Application controller 503 is, for example, a field-programmable gate array (FPGA) or a graphics processing unit (GPU). In one example, application controller 503 is computer 131 of FIG. 2.

A security device 509 is used to monitor and secure communications within the computing system. For example, security device 509 determines whether data read from a memory is valid or is deemed corrupted. Security device 509 is for example an FPGA.

In one embodiment, an artificial neural network (ANN) is implemented using the computing system of FIG. 5. In this implementation, a main application controller 501 is the main processing device for the system. Main application controller 501 receives sensor inputs from sensors of the vehicle (e.g., vehicle 111 of FIG. 1) such as LIDAR, braking, camera, and actuator output such as acceleration, braking, engine control, etc.

The sensor inputs can be generated, for example, using a camera sensing visible lights and/or infrared lights, or a LIDAR, RADAR, or sonar system, in the form of an image or a video capturing an item, such as an event or an object. The sensor inputs can include data representing the image or video, and/or input data extracted or derived from the image or video. Actuators (e.g., to control braking, engine, steering, etc.) are used to implement control actions that are determined from the ANN based on sensor inputs.

In one embodiment, application controller 503 implements the ANN. Application controller 503 is coupled to system memory 505 (e.g., DRAM system memory) and boot device 507 (e.g., boot device 507 contains firmware needed to run the application controller 503). Security device 509 includes a safety hypervisor and a safety controller. In one example, the safety controller is implemented in an FPGA. In other examples, the safety controller can be implemented in other types of controllers. In one embodiment, security device 509 is an external device that can receive the data (e.g., data read from memory), an address used to read the data, and a digest used to do a digest comparison as described herein.

Code for the ANN is stored in the system memory 505. The code includes, for example, inputs p1, p2, etc. and outputs a1, a2, etc. For example, the ANN can have multiple layers. The inputs, such as sensor data, are transmitted to layer one. The input data is processed in layer one and then sent for further processing. For example, the data can be sent to the next layer, to another node within the current layer, to a previous layer, or back to the same node for further processing.

In various embodiments, as described further below, the ANN is executed from the system memory 505. The ANN is moved to a code area of system memory 505 (e.g., DRAM). In one example, each page of the DRAM contains a portion of the ANN (e.g., one or more rows of matrices of the ANN).

Figure 6:
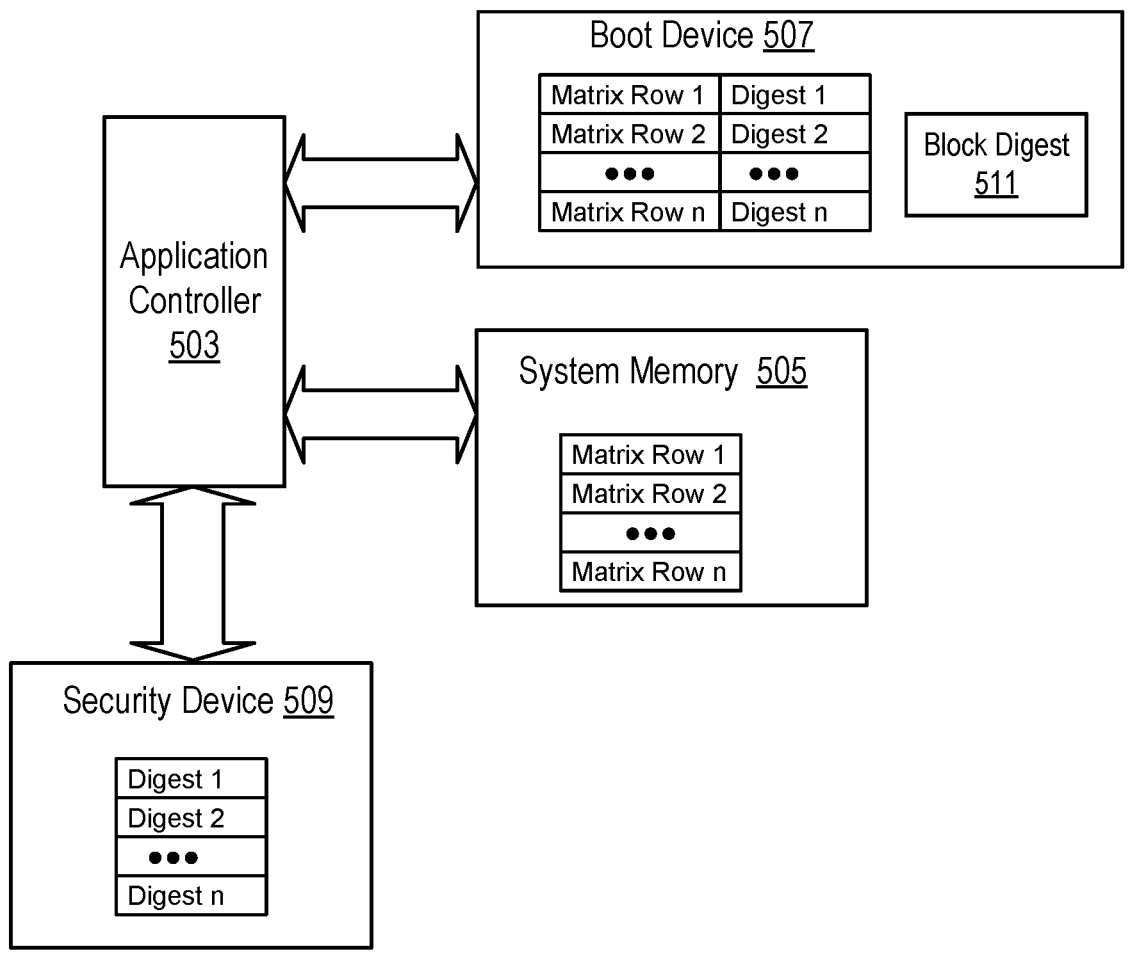
FIG. 6 shows an example of a boot phase for the computing system of FIG. 5 where digest data is stored in a security device, according to one embodiment.

FIG. 6 shows an example of a boot phase for the computing system of FIG. 5 where digest data (e.g., Digest 1, Digest 2, . . . , Digest n) is stored in security device 509, according to one embodiment. In one embodiment, the digest data corresponds to the first digest generated for data to be stored, as discussed above. The digest data includes a digest generated for each matrix row (e.g., Matrix Row 1, 2, . . . n) stored in memory. The first digests are generated for data that is to be stored. In one embodiment, the first digests are then stored in association with the stored data (e.g., stored in boot device 507).

In one embodiment, the boot device 507 contains the layers of the ANN matrix and the associated digests stored in multiple rows. There could be one row for each matrix layer, multiple rows per layer, or multiple layers per row.

The boot device 507 also contains a block digest 511. The block digest 511, for example, is a mechanism that encompasses all the individual digests (e.g., Digest 1, Digest 2, . . . , Digest n) and can be used to determine if there is any data corruption in a block of data (e.g., many rows of data stored in the array in boot device 507).

In one embodiment, there are two levels of checks: the individual digests at the layer level and the block digest 511 summary check at the device level. During system boot, the block digest 511 is first checked to make sure the boot device content is correct. If so, the matrix row digests are copied to a safety hypervisor executing on security device 509 as a set of stored digests (as illustrated). For example, the first digests stored in boot device 507 are copied during the boot phase to security device 509 for later use during runtime, as discussed below.

In one embodiment, the block digest 511 is generating using a hash function by using some or all matrix rows of data for an ANN as inputs to the hash function. Block digest 111 can also be sent, for example, by server 101 of FIG. 1.

In addition, the matrix rows are copied from boot device 507 to a code area (see FIG. 7 below) of system memory 505. The matrix rows will be used during execution of the ANN from the system memory 505.

Figure 7:
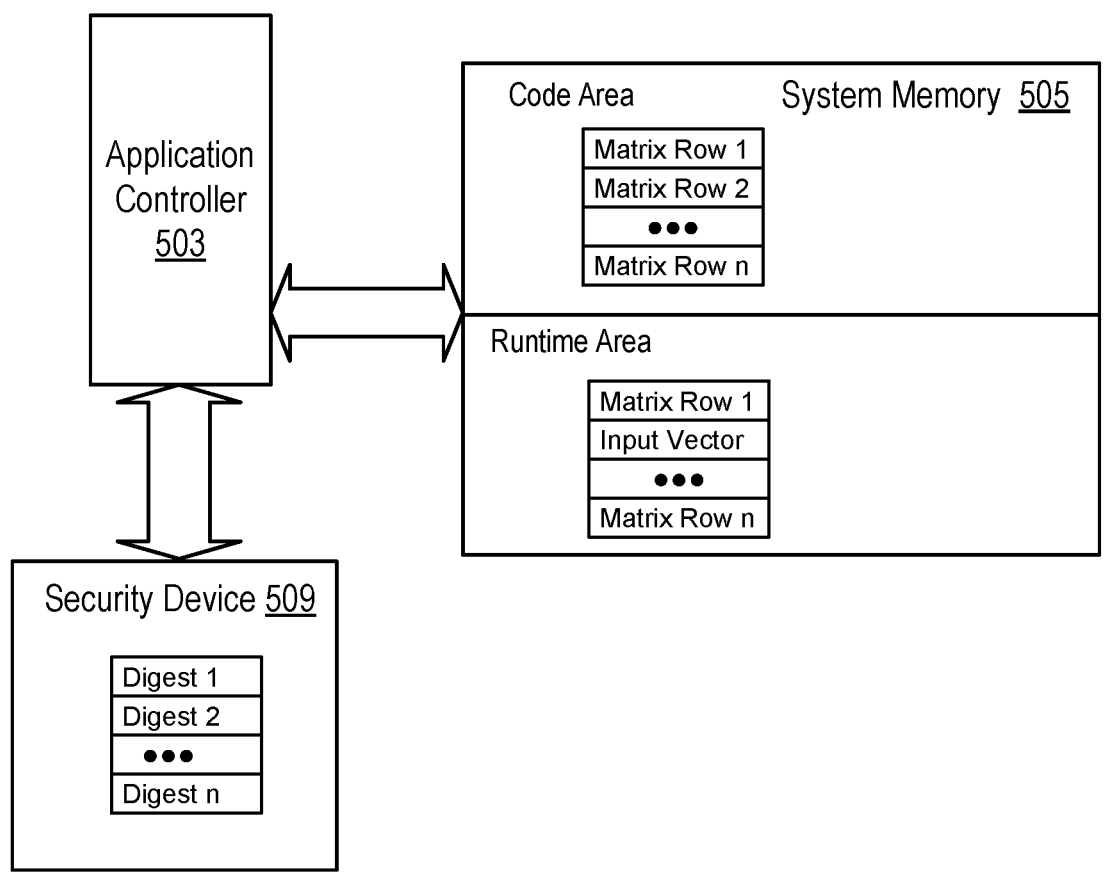
FIG. 7 shows an example of runtime operation for the computing system of FIG. 6, according to one embodiment.

FIG. 7 shows an example of runtime operation for the computing system of FIG. 6, according to one embodiment. The system memory 505 contains two copies of the matrix rows, one stored in a code area (e.g., Code Area, as illustrated) and one stored in a runtime area (e.g., Runtime Area, as illustrated). At runtime, the matrix rows are copied from the code area to the runtime area, for example, one-by-one to build the ANN in system memory. The same row of data is also copied to the security device 509.

When the security device 509 receives each row, the security device 509 calculates a digest and compares it with the stored digest previously loaded (e.g., during the boot phase above). If the calculated digest and stored digest do not match, then a hypervisor executing on security device 509 flags the error for application controller 503. The security device 509 and hypervisor can store the digests in either volatile memory or non-volatile memory such as local RAM, NOR flash, NAND flash, or 3D XPoint memory.

In one embodiment, security device 509 includes a cryptographic engine that generates the second digest as each row is received. Security device 509 performs a comparison of the stored first digest to the generated second digest for each row being copied.

Figure 8:
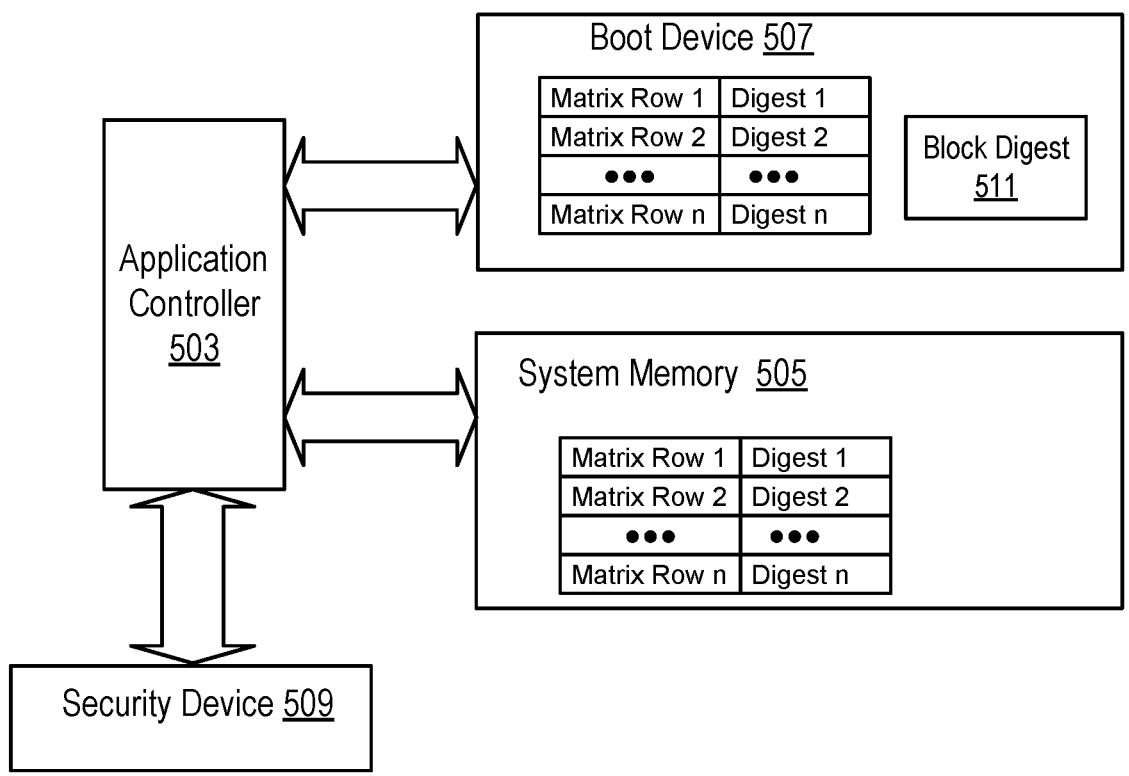
FIG. 8 shows an example of a boot phase for the computing system of FIG. 5 where digest data is stored in a system memory, according to one embodiment.

FIG. 8 shows an example of a boot phase for the computing system of FIG. 5 where digest data is stored in system memory 505, according to one embodiment. The operation of the system of FIG. 8 is similar to that as discussed above for FIG. 6. In this embodiment, the first digests (Digest 1, 2, . . . , n) are copied from boot device 507 and stored in the code area of system memory 505.

In one embodiment, the security device 509 copies each generated digest back to the runtime area of the system memory to enable continuous checking of data validity. In one embodiment, security device 509 stores the first digest values in volatile memory.

In one embodiment, the application controller 503 handles communications regarding the correctness of the data in the matrices for the ANN. In this embodiment, the first digests are stored in the code area of system memory 505, instead of storing the first digests during the boot phase in security device 509 as for FIG. 6.

Figure 9:
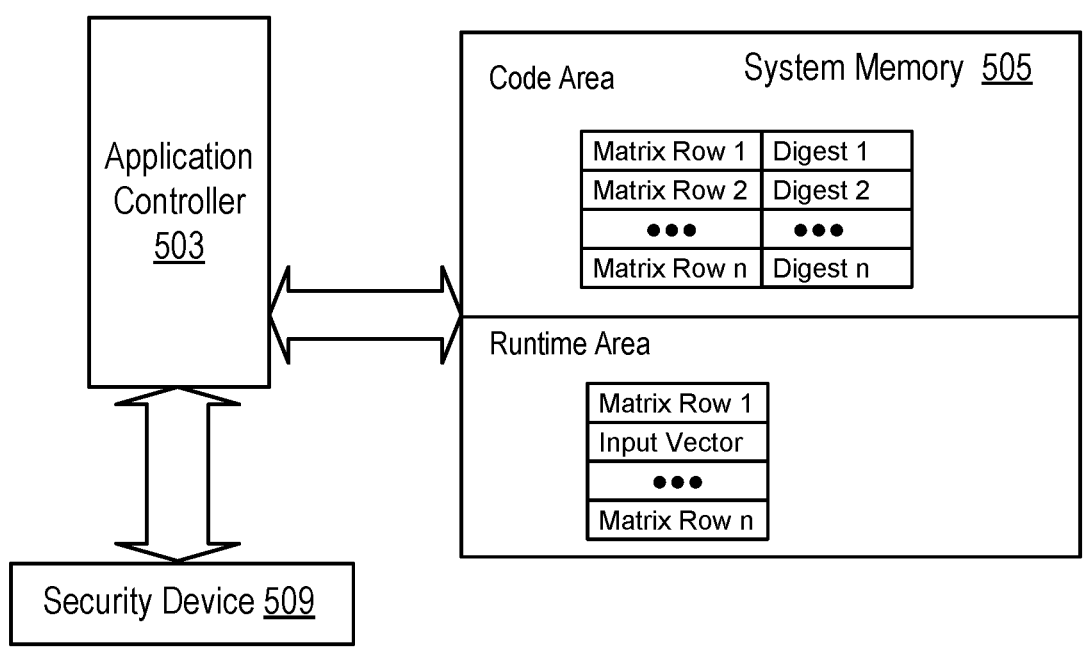
FIG. 9 shows an example of runtime operation for the computing system of FIG. 8, according to one embodiment.

FIG. 9 shows an example of runtime operation for the computing system of FIG. 8, according to one embodiment. When the system is executing the ANN in runtime mode, each matrix row is moved one-by-one from the code area to the runtime area of system memory 505. Each corresponding matrix row is also moved to security device 509. In addition, the corresponding digests are moved from the code area of system memory 505 to security device 509.

As the security device 509 receives each row and its associated stored first digest, a new expected (second) digest is calculated, for example, as was described above. The newly-calculated second digest is compared to the received first digest, as was described above. In one example, based on this comparison, a warning signal is sent to application controller 503 if there is a mismatch.

In one embodiment, the first digests (generated prior to storing data in memory) are stored at the factory level and/or during a secure update (e.g., an OTA update of firmware and/or data). For example, the first digests can be sent to vehicle 111 by server 101 of FIG. 1.

Figure 10:
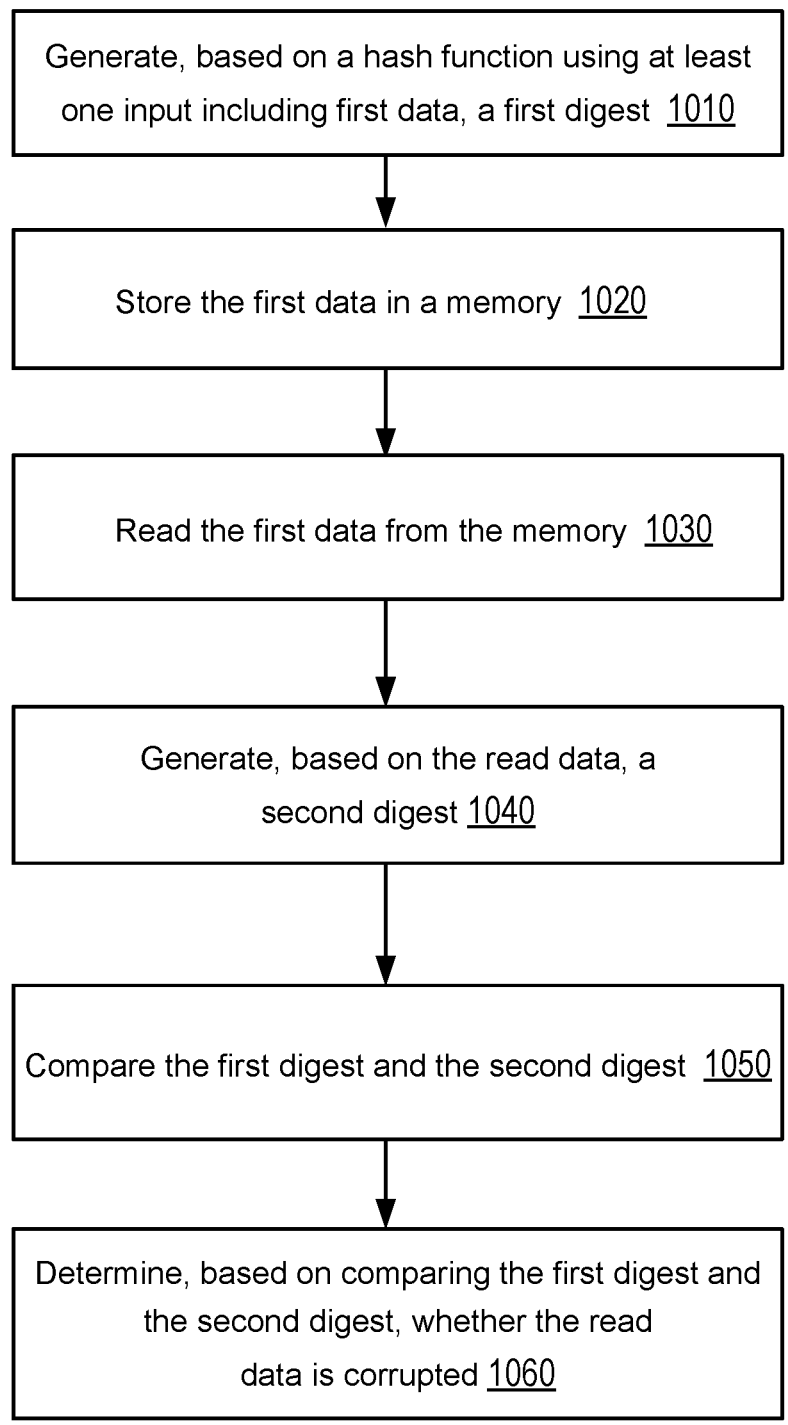
FIG. 10 shows a method for determining whether data read from a memory is corrupted, according to one embodiment.

FIG. 10 shows a method for determining whether data read from a memory is corrupted, according to one embodiment. For example, the method of FIG. 10 can be implemented in one of the computing systems of FIGS. 2-5. The method of FIG. 10 includes, at block 1010, generating a first digest for first data (e.g., a page of data for an ANN) to be stored in a memory. The first digest is generated based on a hash function that uses at least one input including the first data to be stored. In one example, the inputs to the hash function include the first data and the address at which the first data will be stored.

At block 1020, the first data is stored in the memory. In one example, the first data is stored in boot device 507 or system memory 505.

At block 1030, the first data is read from the memory. For example, application controller 503 reads a row of data from a code area of system memory 505 and copies the row to a runtime area of system memory 505.

At block 1040, a second digest is generated based on the read data. For example, the second digest is calculated by security device 509 after receiving a copy of a row of data being copied to the runtime area of system memory 505.

At block 1050, the first digest and the second digest are compared. For example, the security device 509 stores the first digest in memory from a boot phase. At a later time during runtime, the security device 509 generates the second digest for comparison to the stored first digest.

At block 1060, based on the comparison of the first digest to the second digest, a determination is made whether the read data is corrupted. For example, the security device 509 makes the determination whether the read data is corrupted. In one example, the security device 509 sends a signal to application controller 503 indicating that the read data is invalid.

Various other embodiments are now described below. In one embodiment, a method implemented in at least one computing device comprises: generating, based on a hash function using at least one input including first data, a first digest; storing the first data in a memory; reading the first data from the memory; generating, based on the read data, a second digest; comparing the first digest and the second digest; and determining, based on comparing the first digest and the second digest, whether the read data is corrupted.

In one embodiment, the at least one input used by the hash function further includes at least one of: an address at which the first data is stored in the memory; or metadata associated with the first data.

In one embodiment, the memory is a boot device of a controller, and the method further comprises copying the read data and the first digest to a system memory of the controller.

In one embodiment, reading the first data from the memory comprises reading the first data by a first computing device, and the method further comprises sending the read data to a second computing device, wherein comparing the first digest and the second digest is performed by the second computing device.

In one embodiment, the method further comprises, in response to determining that the read data is corrupted, performing at least one action.

In one embodiment, the first data is stored in the memory by a controller, and the at least one action comprises at least one of: sending a signal to the controller that indicates the first data is corrupted; re-reading the first data from the memory; terminating a process executing on the controller; or containing data identified as being corrupted.

In one embodiment, the memory is a boot device, and the method further comprises copying, by a controller, a plurality of rows of data from the boot device to a system memory of the controller, wherein the rows include a first row and a second row, the first data is stored in the first row, and comparing the first digest and the second digest is performed prior to copying the second row.

In one embodiment, the memory is a code area of a system memory of a first computing device, and the method further comprises copying a plurality of rows of data from the code area to a runtime area of the system memory, wherein the rows include a first row and a second row, the first data is stored in the first row, and comparing the first digest and the second digest is performed prior to copying the second row.

In one embodiment, the method further comprises sending the first digest to a second computing device, and generating the second digest is performed by the second computing device.

In one embodiment, the first computing device is a field-programmable gate array (FPGA), and the second computing device is an FPGA, a controller, or a computing device executing a hypervisor.

In one embodiment, the method further comprises: storing the first digest in the memory as being associated with the stored first data; generating a third digest for a block of data stored in the memory, wherein the block of data includes a plurality of rows of data, and the rows include a first row storing the first data; and determining, using the third digest, whether the block of data is corrupted.

In one embodiment, storing the first data comprises writing, by a controller, the first data to a volatile memory or a non-volatile memory.

In one embodiment, the first data is stored in a first row of a plurality of rows stored in the memory, and the plurality of rows corresponds to matrices of an artificial neural network.

In one embodiment, storing the first data comprises writing the first data by a controller, and the method further comprises, after reading the first data, storing the read data in a system memory of the controller.

In one embodiment, storing the first data comprises writing the first data by a controller, and the memory is a system memory of the controller.

In one embodiment, storing the first data comprises storing the first data by a first computing device, and the method further comprises sending the first digest to a second computing device, wherein comparing the first digest and the second digest is performed by the second computing device.

In one embodiment, storing the first data comprises storing the first data in a first row of a plurality of rows stored in the memory, and the method further comprises generating a third digest (e.g., block digest 511) for a block of data stored in the memory, wherein the block includes the plurality of rows, and wherein the third digest is generated using a hash function with at least one input including at least one of: data stored in the plurality of rows; or a plurality of respective digests (e.g., Digests 1, 2, . . . , n of FIG. 8), wherein each respective digest corresponds to a digest generated for a respective row of the plurality of rows.

In one embodiment, a system comprises: at least one processor; and memory containing instructions configured to instruct the at least one processor to: generate, based on a hash function using data as an input, a first digest; store the data in a first memory; read the data from the first memory; generate, based on the read data, a second digest; and determine, based on a comparison of the first digest and the second digest, whether the read data is corrupted.

In one embodiment, the first memory comprises a system memory, or a memory of a boot device; the at least one processor comprises a controller, a field-programmable gate array, or a computing device executing a hypervisor; and the method further comprises storing the first digest in at least one of the first memory or a second memory.

In one embodiment, a non-transitory computer storage medium stores instructions which, when executed by at least one processor, cause the at least one processor to: generate a first digest using a hash function, wherein the hash function uses inputs including a page of data, and a first address at which the page is to be stored after generating the first digest; store the page at the first address in a memory; read the page from the first address of the memory; generate, based on the read page and the first address, a second digest; and determine, based on a comparison of the first digest and the second digest, whether the read page is corrupted.

In one example, a non-transitory computer storage medium can be used to store instructions of the firmware 127, or firmware for application controller 152. When the instructions are executed by computer 131, or the application controller 152, the instructions cause the respective computer 131 or application controller 152 to perform any of the methods discussed above.

Variations of Determining Data Validity

Various additional non-limiting embodiments are now described below. In one embodiment, cryptographic hashing is used to ensure correct communication between a controller and a memory device. The controller detects when there is an error in a computing system, identifies the type of error, and takes counter-measures to prevent propagating erroneous data.

In one embodiment, the computing system identifies and intercept errors. If there is an error correction, the application or other controller is informed about the presence of the errors to prevent future issues or propagating the errors. In one embodiment, the computing system has the capability to disable internal error correction and have an external controller fix errors and write back corrected data to DRAM. In one embodiment, an external system measures error rates and determines if ECC is correcting errors, and when the corrections are occurring. In one example, DRAM has Error Correction Code (ECC) that can correct one error on a page. The error correction is performed internally and is not communicated external to the DRAM.

In one embodiment, a mechanism is used to inform an external controller that the main application is waiting for data that contains errors, or that the main application is evaluating data that may contain errors (e.g., because the number of errors exceeds the ability of ECC to correct the errors). If there are too many errors for ECC to correct, ECC may insert more errors into the data.

If the number of errors exceeds the ECC correction capability, the system can add more errors by trying to correct bits that are already correct. For example, a ECC implementation might detect two bit errors and correct one bit error. If there are three errors in one page, the first two errors will not be detected. The third error will be detected. The ECC algorithm will, for example, try to correct the third error and will introduce a fourth error with the attempted correction. Various embodiments as described herein provide a solution to this problem.

In one embodiment, when the internal ECC is operating, the hypervisor receives a notification when a correction is performed. This permits evaluating the probability that another error is occurring, or permits calculating a method to fix the internal error.

In one embodiment, if internal ECC is disabled, then the hypervisor can direct corrective action. The external controller can take counter measures to re-write the data or erase the block in the case of a non-volatile memory and replace it with the correct data.

In one embodiment, in a Real Time Operating (RTO) system, instructions are executed in place. The instruction pointer is jumping from one location to another without time to implement on-the-fly corrections. Various embodiments herein can provide a method of applying corrections as needed for artificial intelligence systems.

For example, in an autonomous vehicle application, map errors need to be communicated promptly. If the vehicle's sensors are detecting, for example, that there is a cat on the road, but for an unknown reason the internal state machine is indicating it is something else like a human, the safety controller can advise the main controller that there is an algorithm error, and the algorithm can be re-run, or another method used to identify the obstacle.

Now discussing another example regarding digest comparison, the address at which data is to be stored is concatenated with the data to be stored and a hash function is run on this concatenation. In this example, if the data is a 4K byte array and the address is, for example, 256, the 4K byte array and address (256) would both be stored. The 4K byte of data and address would then be concatenated and the hash function digest calculated. The hash digest would be stored, for example, in a spare area of memory. When the data is later read back, the digest is read with the data. The hash digest is recalculated with the data read from storage, and the address and the calculated digest are compared with the digest read from storage. If both digests match, the data and address are valid. If not, there is deemed to be an error.

In one example, in a memory device a DRAM implementation uses several levels of address decoding starting with the row address as a first level address decode. The row address decode is then combined with a second level address decode (column address decode). The resulting address is then sent to the high voltage address decode for accessing the memory array. This address is also sent along with a page of data (and metadata, if present) that is to be written to a cryptographic algorithm to calculate the hash digest. The page of data and metadata are written to the memory array, and the calculated hash digest is written to a spare area in the memory for that page. In some cases, there would be one digest per row. In other cases, since there can be multiple pages per row there can be up to one digest per page.

In various embodiments, the metadata above can include data such as ECC bits. ECC is useful for correcting single-bit errors, but is typically not useful for detecting multi-bit errors. The hash digest in the present embodiments significantly increases the ability of a system to detect multi-bit errors.

In one embodiment, if ECC data is included, ECC corrections are made to data read from memory before the hash digest is calculated. This ensures that any additional errors introduced due to having more bit-errors than the ECC system can properly handle (due to capability limitations) are detected by the digest.

In one embodiment, the use of the hash digest comparison also provides protection against any errors introduced on the data bus. Since the main controller calculates a digest based on the address it put on the bus and the data it received back, any error introduced at any point in the data retrieval or transmission will change the calculated digest, which results in detection of the error.

Closing

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully-functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
   at least one processor; and
   memory containing instructions configured to instruct the at least one processor to:
   generate a first digest associated with an address in system memory, the first digest generated using first data and the address;
   store the first data in the system memory;
   read the first data from the system memory;
   generate a second digest;
   receive a comparison of the first digest and the second digest;
   determine whether the read first data is corrupted; and
   instruct the processor to copy rows of data, wherein the rows include a first row and a second row, the first data is stored in the first row.

2. The system of claim 1, wherein a first computing device includes the processor, and the instructions are further configured to instruct the processor to send the read first data to a second computing device.

3. The system of claim 2, wherein the comparison is received from the second computing device.

4. The system of claim 1, wherein the instructions are further configured to instruct the processor to, in response to determining that the read first data is corrupted, perform at least one action.

5. The system of claim 4, wherein the first data is stored in the system memory by a controller, and the at least one action comprises sending a signal to the controller indicating that the read first data is corrupted.

6. The system of claim 1, wherein the comparison of the first digest and the second digest is performed prior to copying the second row.

7. The system of claim 6, wherein the instructions are further configured to instruct the processor to send the first digest to a computing device configured to generate the second digest.

8. The system of claim 7, wherein the computing device is further configured to execute a hypervisor.

9. The system of claim 6, wherein the rows of data correspond to matrices of an artificial neural network.

10. The system of claim 1, wherein storing the first data comprises storing the first data in rows in the system memory, and wherein the instructions are further configured to instruct the processor to generate a third digest for a block of data stored in the system memory, wherein the block includes the rows, and the third digest is generated using a hash function.

11. The system of claim 10, wherein the hash function uses an input including data stored in the rows.

12. The system of claim 1, wherein storing the first data comprises writing the first data by a controller, and wherein the instructions are further configured to instruct the processor to, after reading the first data, store the read first data in a system memory of the controller.

13. The system of claim 1, wherein storing the first data comprises writing the first data by a controller.

14. The system of claim 1, wherein the address is for a row storing the first data in the system memory.

15. The system of claim 1, wherein the first digest is stored in a spare area of non-volatile memory.

16. A system comprising:
    at least one memory; and
    at least one processor configured to:
    generate a first digest using first data and an address;
    store the first digest in the memory;
    read the first data from the memory;
    generate a second digest using the address;
    determine whether the read first data is corrupted; and
    copy a plurality of rows of data from the boot device to a system memory.

17. The system of claim 16, wherein the memory comprises memory of a boot device.

18. The system of claim 17, wherein
    the rows include a first row and a second row, the first data is stored in the first row, and a comparison of the first digest and the second digest is performed prior to copying the second row.

19. The system of claim 16, wherein the first data is stored by a first computing device, the processor is further configured to send the first digest to a second computing device, and a comparison of the first digest and the second digest is performed by the second computing device.

20. A method comprising:
    generating a first digest using a row address;
    storing data at the row address in a memory of a first computing device;
    reading the data from the memory;
    generating a second digest using the row address;
    receiving, from a second computing device, a comparison of the first digest and the second digest; and
    determining whether the read data is corrupted.

* * * * *